United States Patent [19]
Harris

[11] Patent Number: 5,472,631
[45] Date of Patent: Dec. 5, 1995

[54] METHOD OF REMOVING OIL-BASED PAINT FROM PAINTING ARTICLES

[76] Inventor: Jack W. Harris, 125 Flanders Rd., Woodbury, Conn. 06798

[21] Appl. No.: 366,397

[22] Filed: Dec. 29, 1994

Related U.S. Application Data

[63] Continuation of Ser. No. 106,533, Aug. 16, 1993, abandoned.
[51] Int. Cl.⁶ .................. C09D 9/04; C11D 7/50
[52] U.S. Cl. ............ 252/171; 252/162; 252/170; 252/DIG. 8
[58] Field of Search .................. 252/162, 171, 252/174.17, 170, DIG. 8

[56] References Cited

U.S. PATENT DOCUMENTS

| | | | |
|---|---|---|---|
| 4,133,779 | 1/1979 | Hellyer et al. | 252/547 |
| 4,251,383 | 2/1981 | Kemp | 252/118 |
| 4,316,824 | 2/1982 | Pancheri | 252/551 |
| 4,508,634 | 4/1985 | Elepano et al. | 252/163 |
| 4,606,840 | 8/1986 | Gautier et al. | 252/171 |
| 4,614,612 | 9/1986 | Reilly et al. | 252/544 |
| 4,812,255 | 3/1989 | Suwala | 252/142 |
| 5,098,592 | 3/1992 | Narayanan et al. | 252/162 |
| 5,104,567 | 4/1992 | Staehr | 252/174.17 |

*Primary Examiner*—Richard L. Raymond
*Assistant Examiner*—Brian Bembenick

[57] ABSTRACT

A method for cleaning uncured oil-based paint and varnish from paintbrushes and other painting tools utilizes a cleaning composition produced by blending vegetable or mineral oil with emulsifying surfactants in the preferred ratio of from 85% –50% oil to 50% –15% surfactants, the composition is preferably water free. The cleaning composition is applied to the brush or tool and worked in for about 30 seconds. The brush or tool is then rinsed with water for about 1 minute. The procedure is repeated until the brush or tool is substantially free of paint.

18 Claims, No Drawings

METHOD OF REMOVING OIL-BASED PAINT FROM PAINTING ARTICLES

This is a continuation of prior complete application U.S. application Ser. No. 08/106,533 filed Aug. 16, 1993 abandoned.

BACKGROUND OF THE INVENTION

The present invention relates to a cleaning composition to be used for cleaning oil-based paint from brushes and other tools such as rollers and sponges that have been used to apply said oil-based paint. The method of cleaning of oil-based paint from paintbrushes and painting tools has until now been done by soaking the brushes or tools in a solvent such as mineral spirits or turpentine. While this method effectively cleans the brush or painting tool it has serious environmental, health and safety drawbacks. The solvents used for this purpose are generally flammable creating a serious fire hazard. Secondly, they are also volatile organic compounds which quickly evaporate and contribute to hydrocarbon pollution of the atmosphere and resultant high ground level ozone concentrations. Thirdly, they are health hazards which can cause injury to internal organs due to inhalation and can cause dermatitis due to contact with the skin. Fourthly they are inconvenient to use and difficult to dispose of properly. Patents have been issued for safer paint brush cleaners but none so far have enjoyed commercial success.

U.S. Pat. No. 4,606,840 describes a composition containing hydrocarbons or chlorohydrocarbons, ketone, glycol, alcohols and/or other solvents, and a liquid surfactant and cosurfactant in a formulation containing water that is useful in cleaning paint from brushes and allows the cleaning to be finished off in water. The formulation described by this patent contains a high concentration of hazardous chemicals that could represent a health hazard to the user of the formulation as well as a danger to the environment.

U.S. Pat. No. 4,812,255 describes a paint remover for uncured paint containing organic carboxylic acid, N-methyl-2-pyrrolidone (NMP) and an alkylene glycol ether. This formulation is expensive and contains a high percentage of corrosive acids.

U.S. Pat. No. 5,098,592 describes a formulation for removing varnish and paint from wood or metal which comprises activating NMP and/or BLO with about 1–30% by weight of an activated compound which is ethyl 3-ethoxypropionate (EEP). This paint remover would be prohibitively expensive for use in cleaning uncured paint from brushes and tools.

U.S. Pat. No. 4,251,383 describes a cleaning liquid containing an essential oil (eucalyptus oil), a softening agent (a fixed oil derivative such as coconut oil diethanolamide), and surfactants. It is stated that the formulation is useful in removing soil, stains, varnishes and the like from various surfaces and natural fibers. It appears that this formulation is designed for removing stains and not for removing large amounts of paints from paintbrushes. In any case the use of large amounts (50–70 %) of eucalyptus oil or other essential oil will render the formulation prohibitively expensive for cleaning paintbrushes.

U.S. Pat. No. 5,104,567 describes the use of a blend of 90–99% vegetable oil (in particular soy oil) and 1–10% of a surfactant emulsifier for cleaning ink from machine parts and rubber sheets in the printing industry. The cleaning process can be finished off with water. I have shown through experimentation that more than 10% surfactant is required to remove paint from paint brushes in a fashion that allows them to be finished up with water. At surfactant levels of 10% or below, partial removal of paint from the paintbrush will occur but a significant amount of paint will remain in the brush when the brush is washed with water. This residual paint will adhere tightly and will not wash out with subsequent treatment with the paint brush cleaner. Many patented and commercial paint removers are intended for removing both cured and uncured paint from surfaces and brushes and as such contain aggressive cleaning agents such as ketones, chlorocarbons, N-methyl-2-pyrrolidone, methylene chloride and other chemical substances. Such aggressive cleaning methods are not necessary for normal cleaning of oil-based paint from paint brushes. The paint that remains in paint brushes and other painting tools does not cure for a matter of hours after use allowing time for the brushes to be cleaned with a much less aggressive, inexpensive and safer cleaning liquid.

SUMMARY OF THE INVENTION

It is, therefore, the object of the present invention to provide a new method for cleaning uncured oil based paint from paintbrushes and other painting tools and articles which avoids the previously disclosed disadvantages of the prior art. The method that I have invented accomplishes this object by first contacting the paintbrush or other painting tool with a formulation which contains vegetable oil, a lipophilic surfactant and a hydrophilic surfactant for about 30 seconds followed by washing the paintbrush in water. The formulation comprises from about 0 to about 30% of the lipophilic surfactant and from about 11 to about 45% of the hydrophilic surfactant.

The lipophilic surfactant serves as an activator for the vegetable oil to facilitate the removal of the paint from the pores of the paintbrush bristles. The large amount of hydrophilic surfactant is necessary in order to prevent the paint from coming out of the emulsion as the emulsion is being infinitely diluted by the wash water stream.

The term "paintbrush" as used in this specification and appended claims shall always be construed to include all articles and appliances conventionally used to mix, manufacture or apply oil-based and water-based paints and varnishes including brushes, rollers, tools, mixers, spraying apparatus and all other such equipment.

DETAILED DESCRIPTION OF THE INVENTION

An effective cleaning formulation and method for cleaning uncured oil-based paint and varnish from paintbrushes and other painting tools that is as effective as the use of turpentine or mineral spirits can be prepared from blending vegetable or mineral oil with emulsifying surfactants in the proper ratios.

It is well known that uncured oil-based paints are readily soluble in mineral spirits and a number of other solvents due to the similarity of the chemical structure of the drying oils used in the paint formulation to that of the non-polar hydrocarbon solvents. Polar solvents such as water are repelled by oil-based paint. Surfactants however can be used to overcome the natural repulsion between the oils in the paint and water and thus create an emulsion. Technology similar to this is used to make waterborne (latex) paints.

Experiments I have performed in cleaning oil-based paint from paint brushes with surfactants show that the gross unadhered paint that is within a paintbrush can be emulsified with the proper combination of surfactants and water. The paint that has adhered to the bristles of the brush however can not be cleaned from the brush in this manner.

Other experiments I have performed show that when vegetable oil and the proper surfactants are used together in the proper ratio a formulation can be created that is effective in cleaning paintbrushes and other painting tools. The vegetable oil in the formulation frees the paint from the paint brush bristles and allows the surfactants to emulsify the paint/oil/surfactant mixture in water so that the brush can be properly cleaned. In order for the cleaning to be effective however the oil/surfactant blend must first be worked into the paintbrush long enough for the oil to dilute the paint in the pores of the paintbrush bristles. This takes about 30 seconds. After this, water can be added to form an emulsion and wash out the paint/oil/surfactant mixture. Usually a second treatment is required to remove small amounts of residual paint. Before the second treatment it is important to get as much water out of the brush as possible since excessive water will cause the oil in the cleaning mixture to emulsify prematurely and prevent it from dislodging the paint from the paint brush bristles.

Surfactants

A wide range of surfactants can be used to produce an effective paint brush cleaner. It is essential to have a hydrophilic surfactant that will form a stable emulsion of the paint and vegetable oil as the emulsion is being diluted under running water. It is also desirable to have a lipophilic surfactant that will facilitate the removal of the paint from the pores of the bristles. In establishing the best formulation it is necessary to balance the cost versus efficiency of the surfactants since some surfactants are effective in smaller concentrations but cost more.

I have found that effective formulations must have a considerable amount of hydrophilic surfactant present in the range of 11 to 45%. The lipophilic content necessary for an effective formulation depends on the solvency demonstrated by the surfactant/oil combination without water present and on the hydrophilic/lipophilic balance (HLB) exhibited by the surfactants after water is added. HLB values for most available surfactants are well known by those skilled in this art. The explanation of HLB Methodology is contained in Rosen, Milton J., "Surfactants and Interfacial Phenomena", Wiley & Sons (N.Y. 1978), pages 242–5, incorporated herein by reference. The most effective formulations have an HLB in the range of 9.0–15.0. Even more preferred combinations have an HLB of about 10–13 and most preferred combinations have HLB of 11–12.

My experiments show that effective formulations can be made with from 0 to 30% lipophilic surfactant present.

In some cases a single surfactant can be used if it has the right HLB (Hydrophilic/Lipophilic Balance) and the ability to act as a solvency promoter when no water is present and to act as a hydrophilic surfactant when water is present.

The surfactants suitable for the practice of the present invention must provide the proper emulsion stability, and they must be non-toxic. Representative surfactants which are suitable for the present invention include A. Anionic agents
 1. Sodium, potassium and ammonium soaps derived from fatty acids having from 10 to 22 carbon atoms.
 2. Amine soaps derived from fatty acids having from 10 to 22 carbon atoms and primary, secondary and tertiary amines such as monoethanolamine, diethanolamine and triethanolamine, and cyclic amines such as morpholine, e.g., triethanolamine stearate.
 3. Rosin soaps such as sodium salts of rosin acids such as abietic acid.
 4. Alkali metal salts of sulfate compounds which can be represented by the formula $ROSO_3H$ wherein the R group represents an organic moiety such as a fatty alcohol having up to 22 carbon atoms. These include sodium lauryl sulfate, sodium cetyl sulfate, sodium monolauryl glyceryl sulfate, an oil such as sulfated castor, olive, teaseed, neat's foot cottonseed, rape seed, corn and rice, oil, etc.
 5. Alkali metal salts of sulfonated compounds which can be represented by the formula $RSO_3H$ wherein the R group represents an organic moiety having from 8 to 22 carbon atoms. These include alkane sulfonates such as dioctyl sodium sulfosuccinate, oxyethylated alkyl lauryl sulfate, alkyl aromatic sulfonates such as sodium isopropylnaphthalenesulfonate, sodium dodecylbenzenesulfonate, sodium sulfonaphthylstearate.

B. Nonionic agents
 1. Ethers such as condensation products of alkyphenols with from 6 to 20 moles of ethylene oxide, the phenols being monoalkylated, dialkylated or polyalkylated with alkyl side chains having from 5 to 18 carbon atoms and the corresponding naphthalene or diphenyl compounds; polyoxyethylene and polyoxyethylene-polyoxypropylene copolymers.
 2. Esters such as compounds which can be represented by the formula RCOOR' wherein R is a long hydrocarbon chain derived from a fatty acid having from 12 to 22 carbon atoms and R' is a polyhydric alcohol, e.g., glyceryl monostearate, diethylene glycol monolaurate, sorbitan fatty acid esters derived, for example from lauric, palmitic, stearic and oleic acids.
 3. Ether-esters wherein polyoxyethylene chains are found with an unreacted hydroxy group of esters of fatty acids and polyhydric alcohols.
 4. Fatty acid amides such as lauroyl diethanolamide.

C. Ampholytic
 1. Surfactants such as those having amino and carboxy groups, e.g., dodecyl B-alanine, imidazoline derivatives.
 2. Surfactants containing amino and sulfuric acid or sulfonic groups formed by condensing an alkane-sulfonamide with formaldehyde and methyltaurine.

Suitable representative surfactants include sorbitan trioleate, sorbitan tristearate, sorbitan sesquioleate, glycerol monostearate, sorbitan monopalmitate, sorbitan monolaurate, polyoxyethylene lauryl ether, polyethylene glycol monostearate, triethanolamine oleate, polyoxyethylene glycol monolaurate, polyethylene sorbitan monostearate, polyoxyethylenesorbitan monooleate, polyoxyethylene sorbitan monolaurate, sodium oleate, potassium oleate, sodium lauryl sulfate, lauroyl imidazoline, sodium dodecylbenzene sulfonate, sodium monoglyceride sulfate, sodium alkaralkyl polyglycol sulfate, sodium oleyl laurate, sodium dioctyl sulfosuccinate, lauryl polyglycol, ether sodium dibutylnaphthalenesulfonate, alkyl phenol polyglycol ether, sorbitan monolaurate polyglycol ether, sulfonated castor oil, tall oil polyglycol ester, alkyl dimethyl benzylammonium chloride alkyl naphthalene pyridinium chloride, cetyl dimethyl ethylammonium bromide, alkyl dimethyl chlorobenzylammonium chloride, dibutyl phenyl phenol sulfonate, ester of colaminoethylformyl methyl pyridinium chloride, sulfonated methyl oleylamide, sorbitan monolaurate polyglycol ether, polyglycol oleate, sodium lauryl sulfoacetate, sodium 2-ethylhexanol sulfate, sodium 7-ethyl-2-methyl-undecanol-4 sulfate, sodium 3,9-diethyltridecanol-6 sulfate, sodium lauryl and myristyl collamide sulfate and N-(sodium sulfoethyl) oleamide, etc. The preferred surfactants are fatty acid esters and fatty alcohol esters.

Cationic agents may be useful only to the limited extent of balancing properties of the primary types of surfactants A,B, and C above. Representative cationic types are:

1. Amine salts (e.g. hydrochlorides and acetates) derived from straight chain fatty amines having from 8 to 18 carbon atoms, e.g., octyldecylamine hydrochloride.
2. Quaternary ammonium salts formed by alkylation of fatty amines with methyl chloride, dimethylsulfate, benzylchloride and the like. These compounds can be represented by the formula (RR'R"R'"N)Y wherein each of R, R', R", R'" is a long chain aliphatic group of from 8 to 22 carbon atoms or a fatty acid amide; short aliphatic group such as methyl, ethyl, or propyl, an aromatic group such as phenyl or benzyl radical; or a heterocyclic group such as pyridine or piperidine; and Y represents an inorganic or lower organic ion such as chloride, bromide or acetate radical, e.g., triethanolamine stearate cetyl trimethyl ammonium bromide, benzylalkonium chloride.

Preferred Small Brush Surfactants

The following groups of surfactants are judged suitable for use in this invention primarily for small brushes and in combination with water in the cleaning composition (25–50 water). These materials are commercially available as household detergents such as Joy® and Sunlight® as noted in Example 1.

One surfactant system consists of from 30–90 parts by weight of the surfactant system of a Ca-sensitive first surfactant selected from the group consisting of water-soluble $C_9$–$C_{15}$-alkyl benzene sulphonates, alkane sulphonates having 8–20 carbon atoms, olefin sulphonates having from 8–20 carbon atoms, di-$C_{8-20}$-alkyl sulphosuccinates, di-$C_{6-12}$-alkyl phenol sulphosuccinates, primary and secondary alkyl sulphates having 8–20 carbon atoms, $C_{8-20}$-alkyl polyethoxy sulphates having 1–25 ethoxy groups, and mixtures thereof, and from about 70–10 parts by weight of said system of a less Ca-sensitive second surfactant selected from the group consisting of water-soluble nonionic condensation products obtained by condensing from 5–30 moles of an alkylene oxide, preferably ethylene or propylene oxide, with one mole of an organic hydrophobic compound, aliphatic or alkyl aromatic in nature, having 8–24 carbon atoms and at least one reactive hydroxyl, amino, amido or carboxyl group; $C_{8-20}$-alkyl sulphobetaines; amine oxides containing one long chain alkyl moiety of from 10–28 carbon atoms and two moieties which can be either alkyl radicals or hydroxyalkyl radicals having from 1 to 4 carbon atoms, $C_{8-20}$-alkyl polyethoxy sulphates having 1–25 ethylene oxide groups, and mixtures thereof, said surfactants (1) and the ion-active surfactants of group (2) being present in the form of their alkali metal salts, ammonium salts, lower alkanolamine salts, lower alkylamine salts or mixtures thereof.

Examples of nonionic water-soluble condensation products obtained by condensing 5–30 moles of an alkylene oxide with one mole of an organic hydrophobic compound are:

1. the condensates of the ethylene oxide with aliphatic straight chain or branched chain, primary or secondary alcohols of more than 8 carbon atoms such as those derived from tallow or coconut fatty acids, containing 5–20 ethylene oxide groups, and branched chained $C_{11}$–$C_{15}$ alcohols condensed with 5–20 ethylene oxide groups.
2. the condensates of ethylene oxide with alkylphenols, in which the phenols may be mono- or polyalkylated and the total number of carbon atoms in the side chain or chains is from 5 to 18. Specific examples are condensates of one mole nonyl phenol with 8 to 15 moles of ethylene oxide.
3. the condensates of ethylene oxide with fatty acid esters preferably mono-fatty acid esters of the sugar alcohols, sorbitol and manitol.
4. polyethenoxyesters obtained by reacting ethylene oxide with carboxylic acids, the latter being natural fatty acids or synthetic fatty acids made from oxidated paraffin wax having from 8–20 carbon atoms of alkylbenzoic or naphthenic acids having from 5–18 carbon atoms in the alkyl chain.
5. the condensation products of fatty acyl alkanolamides of the type $C_{7-17}$alkyl-CO—NHC$_2$H$_4$OH, $C_{7-17}$alkyl—CO N(C$_2$H$_4$OH)$_2$ with ethylene oxide.
6. the condensation products of $C_{8-18}$alkyl-, $C_{8-18}$alkenyl and $C_{8-18}$alkylaryl amines with ethylene oxide. A specific example is the condensation product of one mole of a dodecylamine with 9–12 moles of ethylene oxide.

Typical examples of surfactant systems are alkyl benzene sulphonate/alkyl polyethoxy sulphate mixtures; alkyl benzene suphonate/alkyl polyethoxy sulphate/nonionic mixtures; alkyl sulphate/alkyl benzene sulphonate/alkyl polyethoxy sulphate mixtures and alkyl sulphate/alkyl polyethoxy sulphate/amine oxide mixtures. Other useful surfactant systems are those in use in Joy and Dawn dishwashing liquids. These are believed to be based on the systems in U.S. Pat. Nos. 4,316,824 and 4,133,779. These are:

(a) 10% to about 50% of an anionic surfactant which has the general formula RO(C$_2$H$_4$O)x—SO$_3$ M wherein R is an alkyl group containing from about 10 to about 16 carbon atoms, M is selected from the group consisting of sodium, potassium, ammonium, monoethanol ammonium, diethanol ammonium, triethanol ammonium, calcium and magnesium cations and mixtures thereof, and the ethoxylate distribution is such that, on a molar basis the compounds wherein X is O are from about 54% to about 60%, wherein X is 1 are from about 15% to about 20%, wherein X is 2 are from about 10% to about 13%, and wherein X is 3 are from about 6% to about 7% of the total, and there is sufficient magnesium to at least neutralize 50% of the anionic surfactant wherein x is 0.

(b) from 1% to about 20% of a suds stabilizer;

(c) from about 0% to about 10% of a detergency builder selected from inorganic phosphates, polyphosphates, silicates, and carbonates, organic carboxylates, phosphonates and mixtures thereof; and (d) from about 20% to about 88% water.

Alternatively small brush surfactant systems can utilize vegetable oil and a surfactant of:

(a) a semi-polar organic nonionic detergent selected from the group consisting of (1) water-soluble amine oxides having one alkyl oxyhydroxyalkyl moiety of 8 to 28 carbon atoms and two alkyl moieties selected from the group consisting of alkyl groups and hydroxyalkyl groups of 1 to 3 carbon atoms, (2) water-soluble phosphine oxides having one alkyl or hydroxyalkyl moiety of 8 to 28 carbon atoms and two alkyl moeties selected from the group consisting of alkyl groups and hydroxyalkyl groups of 1 to 3 carbon atoms, (3) water-soluble sulfoxides having one alkyl or hydroxyalkyl moiety of 8 to 18 carbon atoms and an alkyl moiety selected from the group consisting of alkyl and hydroxyalkyl groups of 1 to 3 carbon atoms, and (4) mixtures thereof; and (b) an alkaline earth metal salt of an anionic detergent selected from the group consisting of (1) linear alkyl benzene sulfonates having 9 to a5 carbon atoms in the alkyl group, (2) alkyl sulfates having 8 to 22 carbon atoms, (3) paraffin sulfonates having 8 to 22 carbon atoms, (4) olefin sulfonates having 8 to 22 carbon atoms, (5) alkyl ether sulfates having 8 to 22 carbon atoms in the alkyl group and 1 to 30 ethylene oxide units (6) alkyl glyceryl ether sulfonates having 8 to 22 carbon atoms in the alkyl group and (7) mixtures thereof in a weight ratio of semi-polar nonionic detergent to anionic detergent of from 1:100 to 1:2.

Types of Oils

A wide variety of vegetable oils can also be used with some being more effective than others but all tested were acceptable. These include Soy, canola, caruso, corn, safflower, peanut, rapeseed, coconut, palm, sunflower, grape oil and any other suitable vegetable oil as well as blends thereof. Oils that do not preserve well will not be suitable. It is possible to use mineral oil as a replacement for the vegetable oil but the resultant brush cleaner will not be as environmentally acceptable.

Other Optional Ingredients

Well known types of additives to enhance the quality of the cleaning composition can be added in effective amounts including electrolytes, detergency builders, builder salts which can be added to promote the cleaning and soil-removal efficiency of the surfactants of the composition, e.g. phosphates, polyphosphates, phosphonates, carbonates, polyacetates and polycarboxylates; lather promoting agents, such as coconut fatty acid diethanoi amide; hydrotropes and solubilising agents, such as the lower alkanols containing 2–4 carbon atoms, especially ethanol, urea, sodium or potassium toluene sulphonate and sodium or potassium xylene sulphonate, which are generally added to promote phase stability especially of compositions with high concentrations of surfactants; preservatives; perfume and coloring agents; and other functional additives. Thickening agents act as protective colloids, operating to prevent coagulation and de-emulsification of the composition. They further act to prevent coagulation of the emulsion particles which constitute the composition of the present invention.

Suitable thickening agents for use in the composition of this invention include colloidal alumina, colloidal silica, alginic acid and derivatives thereof, "Carbopol" (carboxyvinyl polymer), cellulose derivatives such as "Klucel" (cellulose ethers), "Methocel" (methyl cellulose), "Natrosol" (hydroxyethyl cellulose), sodium carboxymethyl cellulose, gelatin, gums such as agar, tragacanth, acacia gum, guar gum, and the like and egg yolk, lecithin, pectin, thixin, and resins like ethyleneoxide polymers.

EXAMPLES

In the following examples various compositions were formulated and tested as paint brush cleaners. The test used to judge effectiveness consisted of cleaning polyester, natural bristle, and polyolefin test brushes (one inch, three inch and four inch) with the subject formulation by first saturating the brush in an oil based type paint and then cleaning it in a measured amount of the subject cleaning formulation. Each cleaning consisted of working the formulation into the brush for about 30 seconds and then rinsing the brush with water for about 1 minute. The number of applications of cleaning liquid required to thoroughly clean the brush was recorded as the test result. Results are reported on the natural bristle brush only since the cleaner was equally effective on all three types of brush tested. I also performed experiments with formulations wherein water was used as diluent in the formulation.

Example 1.

Formulations with Household Surfactant Blends

JOY and Dawn brand household dishwashing liquids were used in combination with various vegetable oils. JOY is formulated from alkyl sulfate and alkyl ethoxylated sulfate together with detergency builders and water. SUNLIGHT is formulated from alkyl benzene sulfonate, alkyl polyethoxysulfate, lemon juice, other electrolytes and water. Water makes up about 40–60% of the formulations. Brushes made from natural bristle, polyolefin, and polyester were used. Paints used were alkyd and polyurethane oil-based paint. The type of paint and the type of brush had no significant effect on the results and are thus not identified in the results below. For one inch brushes one tablespoon of cleaning liquid was used for each cleaning. Proportionally more cleaning liquid was used on larger brushes. Cleaning liquid was worked into the brush for 30 seconds and then the brush was washed with water for one minute. The number of cleanings was recorded and cleaning efficiency was judged on a scale of 1–5 with 5 being perfectly clean and 1 being hardly cleaned at all. Results of 2 and above are acceptable.

| SURFACTANT | % | OIL | % | CLEANINGS REQUIRED | CLEANING EFFICIENCY | SIZE BRUSH |
| --- | --- | --- | --- | --- | --- | --- |
| SUNLIGHT | 33 | SOY/5% OLIVE OIL | 67 | 2 | 5 | 1" |
| SUNLIGHT | 33 | SOY | 67 | 2 | 5 | 1" |
| JOY | 33 | SOY/5% OLIVE OIL | 67 | 2 | 5 | 1" |
| JOY | 33 | SOY | 67 | 2 | 5 | 1" |

-continued

| SURFACTANT | % OIL | % | CLEANINGS REQUIRED | CLEANING EFFICIENCY | SIZE BRUSH |
|---|---|---|---|---|---|
| JOY | 33 SAFFLOWER | 67 | 2.5 | 4 | 1" |
| SUNLIGHT | 100 NONE | 0 | 2+ | 1 | 1" |
| SUNLIGHT | 50 SOY | 50 | 2 | 5 | 1" |
| SUNLIGHT | 50 SOY | 50 | 5+ | 1 | 4" |
| SUNLIGHT | 33 SOY | 67 | 3 | 3 | 3" |

JOY IS A PRODUCT AND REGISTERED TRADEMARK OF THE PROCTOR AND GAMBLE COMPANY PATENTED UNDER U.S. PAT. NOS. 4,133,779 & 4,316,824.
SUNLIGHT IS A PRODUCT AND REGISTERED TRADEMARK OF LEVER BROS. AND IS PATENTED UNDER U.S. PAT. NO. 4,614,612.

The above formulations were very effective on one inch brushes.

Example 2

Formulations with Commercially Available Surfactants Using 3 and 4 Inch Brushes

Experiments were performed with surfactants readily available in the commercial market that had the proper lipophilic and hydrophilic properties and that were safe to use. These formulations were tested on 3 and 4 inch brushes in the same manner as in EXAMPLE 1 except that between 2 and 8 tablespoons of cleaning formulation were used.

depends on the solvency demonstrated by the surfactant/oil combination without water present and on the hydrophilic/lipophilic balance (HLB) exhibited by the surfactants after water is added. The most effective formulations have an HLB in the range of 9.0–15.0. My experiments show that effective formulations can be made with from 0 to 30% lipophilic surfactant present.

I claim:

1. A method of cleaning uncured paint from paintbrushes comprising:
   (a) contacting said paintbrushes with a cleaning composition comprising: about 11 to about 75 percent by weight of a surfactant and about 89 to about 25 percent

| SURFACTANT A | % | SURFACTANT B | % | WATER % | TYPE OIL | % | LIQUID USED (TLBS) | NUMBER CLEANINGS | CLEAN. EFF. |
|---|---|---|---|---|---|---|---|---|---|
| TWEEN 20 | 17 | SPAN 20 | 17 | 0 | SOY | 66 | 2 | 3 | 4 |
| TWEEN 20 | 17 | SPAN 20 | 17 | 0 | SOY | 66 | 3 | 3 | 5 |
| TWEEN 20 | 22 | SPAN 20 | 11 | 0 | SOY | 66 | 4 | 5+ | 2 |
| TWEEN 20 | 11 | SPAN 20 | 22 | 0 | SOY | 67 | 4 | 3 | 3 |
| TWEEN 20 | 20 | NONE | | 0 | SOY | 80 | 4 | 5+ | 2 |
| TWEEN 20 | 23 | SPAN 20 | 23 | 8 | SOY | 46 | 4 | 2 | 5 |
| TWEEn 20 | 14 | SPAN 20 | 14 | 22 | SOY/5% OLIVE | 44 | 2 | 5+ | 2 |
| JL 80X | 50 | | | | SOY | 50 | 4 | 5+ | 2 |
| TWEEN 60 | 25 | SPAN 60 | 25 | 0 | SOY | 50 | 4 | 5+ | 2 |
| SDBS | 33 | SLES | 17 | 0 | SOY | 50 | 4 | 5+ | 2 |
| Z504 | 21 | ZB090 | 11 | 0 | SOY | 67 | 4 | 5+ | 2 |
| Z504 | 21 | ZB090 | 11 | 0 | SOY | 67 | 8 | 2 | 5 |
| BRIJ 30 | 25 | | | | SOY/5% OLIVE | 75 | 3 | 3 | 4 |
| BRIJ 30 | 25 | | | | LIGHT MINERAL | 75 | 3 | 4 | 4 |

CLEANING EFFICIENCES OF 4 AND ABOVE WERE JUDGED TO PERFORM ACCEPTABLY.
TWEEN IS AN ICI TRADEMARK FOR THAT COMPANY'S POLYSORBATE SURFACTANT. SPAN IS AN ICI TRADENAME FOR THAT COMPANY'S SORBITAN SURFACTANTS. BRIJ IS AN ICI TRADENAME FOR THAT COMPANY'S OLETH SURFACTANT. JL80X IS A TEXACO, INC. TRADEMARK FOR THAT COMPANY'S ETHOXYLATED NONIONIC SURFACTANT.
SLES = SODIUM LAURYL ETHER SULFATE, SDBS = SODIUM DODECYL BENZENE SULFONATE, Z504 & ZB090 ARE ALKYLPHENOL ETHOXYLATES.

Example 2 demonstrates that satisfactory paintbrush cleaners can be formulated from a number of surfactant/oil blends. In some cases a single surfactant can be used if it has the right HLB (Hydrophilic/Lipophilic Balance) and the ability to act as a solvency promoter when no water is present and to act as a hydrophilic surfactant when water is present. Also it is possible to use mineral oil as a replacement for the vegetable oil but the resultant brush cleaner will not be as environmentally acceptable. I have found that effective formulations must have a considerable amount of hydrophilic surfactant present in the range of 10 to 45%. The lipophilic content necessary for an effective formulation by weight of an oil selected from the group consisting of mineral oil and vegetable oil;

(b) working said cleaning composition into said paintbrushes for a time sufficient to disperse said cleaning composition throughout said paintbrush; and (c) washing said paintbrushes in water to remove said cleaning composition.

2. A method of cleaning uncured paint from paintbrushes according to claim 1 wherein said surfactant of said paintbrush cleaning composition comprises a hydrophilic surfactant and a lipophilic surfactant.

3. A method of cleaning uncured paint from paintbrushes according to claim 1 wherein said surfactant of said paintbrush cleaning composition is a nonionic surfactant.

4. A paintbrush cleaning composition comprising:
  (a) from about 11 to about 75 percent by weight of a surfactant; and
  (b) from about 89 to about 25 percent by weight of a vegetable or mineral oil.

5. The composition of claim 4 wherein said surfactant comprises a hydrophilic surfactant and a lipophilic surfactant.

6. The composition of claim 5 wherein said hydrophilic surfactant is selected from polysorbate surfactants and said lipophilic surfactant is selected from sorbitan surfactants.

7. The composition of claim 5 wherein said hydrophilic surfactant and said lipophilic surfactant are selected from alkylphenol ethoxylate surfactants.

8. The composition of claim 5 wherein said hydrophilic surfactant and said lipophilic surfactant are selected from primary linear alcohol ethoxylate surfactants.

9. The composition of claim 5 wherein said hydrophilic surfactant and said lipophilic surfactant are selected from alcanolamide surfactants.

10. The composition of claim 5 wherein said hydrophilic surfactant and said lipophilic surfactant are selected from linear alkylbenzenesulfonate surfactants.

11. The composition of claim 5 wherein said hydrophilic surfactant and said lipophilic surfactant are selected from carboxylic acid salt surfactants.

12. The composition of claim 5 wherein said hydrophilic surfactant and said lipophilic surfactant are selected from sulfated polyethoxylated linear alcohol surfactants.

13. The composition of claim 5 wherein said vegetable oil is soy oil.

14. The composition of claim 5 wherein said hydrophilic surfactant comprises from about 11 to about 45% of said composition and said lipophilic surfactant comprises from 0 to about 30% of said composition.

15. The composition of claim 5 wherein said hydrophilic surfactant and said lipophilic surfactant have a combined HLB of from 9.0 to 15.

16. The composition of claim 5 wherein said composition further comprises one or more of the group of materials selected from electrolytes and detergency builders.

17. The composition of claim 5 wherein said hydrophilic surfactant comprises from 15 to 30% of said composition and said lipophilic surfactant comprises frqm 10 to 25% of said composition.

18. The composition of claim 5 wherein said hydrophilic surfactant and said lipophilic surfactant have a combined HLB of from about 10 to about 13.

* * * * *